(12) United States Patent
Lombardini

(10) Patent No.: US 11,590,680 B2
(45) Date of Patent: Feb. 28, 2023

(54) METHOD FOR ADJUSTING THE PROFILE OF A FILM IN BLOWN EXTRUSION LINES, ADJUSTED FILM AND REEL

(71) Applicant: Colines S.p.A., Novara (IT)

(72) Inventor: Nicola Lombardini, Oleggio (IT)

( * ) Notice: Subject to any disclaimer, the term of this patent is extended or adjusted under 35 U.S.C. 154(b) by 168 days.

(21) Appl. No.: 15/733,282

(22) PCT Filed: Jan. 7, 2019

(86) PCT No.: PCT/IB2019/050103
§ 371 (c)(1),
(2) Date: Jun. 19, 2020

(87) PCT Pub. No.: WO2019/138311
PCT Pub. Date: Jul. 18, 2019

(65) Prior Publication Data
US 2020/0331185 A1 Oct. 22, 2020

(30) Foreign Application Priority Data

Jan. 12, 2018 (IT) .................... IT102018000000807

(51) Int. Cl.
| | |
|---|---|
| B29C 48/92 | (2019.01) |
| B29C 48/90 | (2019.01) |
| B29C 48/885 | (2019.01) |
| B29C 48/00 | (2019.01) |
| B29C 48/10 | (2019.01) |
| B29C 48/88 | (2019.01) |
| B29C 48/21 | (2019.01) |
| B32B 1/08 | (2006.01) |
| B32B 27/08 | (2006.01) |
| B29L 23/00 | (2006.01) |

(52) U.S. Cl.
CPC ........ *B29C 48/903* (2019.02); *B29C 48/0018* (2019.02); *B29C 48/0022* (2019.02); *B29C 48/10* (2019.02); *B29C 48/21* (2019.02); *B29C 48/885* (2019.02); *B29C 48/913* (2019.02); *B29C 48/92* (2019.02); *B32B 1/08* (2013.01); *B32B 27/08* (2013.01); *B29C 2948/92152* (2019.02); *B29C 2948/92647* (2019.02); *B29C 2948/92657* (2019.02); *B29C 2948/92704* (2019.02); *B29C 2948/92971* (2019.02); *B29L 2023/001* (2013.01); *B32B 2597/00* (2013.01)

(58) Field of Classification Search
CPC ..... B29C 48/903; B29C 48/885; B29C 48/92; B29C 48/10; B29C 48/913; B29C 48/21; B29C 48/0018; B32B 1/08; B32B 27/08; B32B 2597/00; B29L 2023/001
USPC ........................................................ 264/515
See application file for complete search history.

(56) References Cited

U.S. PATENT DOCUMENTS 4,339,404 A * 7/1982 Upmeier ................. B29C 48/92
425/141

FOREIGN PATENT DOCUMENTS

| DE | 4218996 | 12/1993 |
| DE | 10029175 | 6/2001 |
| EP | 2514580 | 10/2012 |
| GB | 2243573 | 11/1911 |

(Continued)

*Primary Examiner* — Christina A Johnson
*Assistant Examiner* — Xue H Liu
(74) *Attorney, Agent, or Firm* — Themis Law

(57) ABSTRACT

A method for the active adjustment of the profile of a film produced with blown extrusion technology, a film obtained with such method and a reel resulting from the winding of the film.

3 Claims, 3 Drawing Sheets

FILM PROFILE

FILM PROFILE WITH SINE CURVE

REEL PROFILE WITHOUT SINE CURVE

REEL PROFILE WITH SINE CURVE

(56) References Cited

FOREIGN PATENT DOCUMENTS

| | | |
|---|---|---|
| JP | 2004122435 | 4/2004 |
| JP | 2005254647 | 9/2005 |

* cited by examiner

FIG. 1
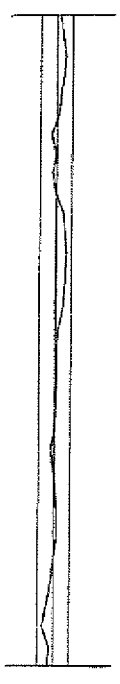
FILM PROFILE
FIG. 1A
REEL PROFILE WITHOUT SINE CURVE
FIG. 1C
FILM PROFILE WITH SINE CURVE
FIG. 1B
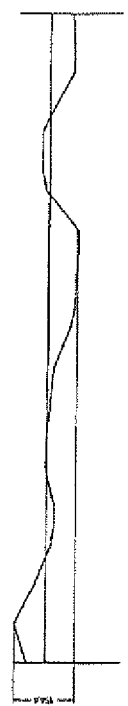
REEL PROFILE WITH SINE CURVE
FIG. 1D

METHOD FOR ADJUSTING THE PROFILE OF A FILM IN BLOWN EXTRUSION LINES, ADJUSTED FILM AND REEL

FIELD OF THE INVENTION

The present invention relates to a method for adjusting the profile of a film in blown extrusion lines, the relative film and reel.

BACKGROUND OF THE INVENTION

The production of plastic film (commonly referred to as "film") suitable for flexible packaging, whether domestic or industrial, has been growing almost constantly for several decades, and together with an increase in the quantitative demand, the quality of the product is also in continuous evolution and specialization.

In particular, the vast majority of the most widespread and used films, especially in the industrial field (which naturally represent the majority consumption compared to domestic use), is currently produced with so-called "blown" extrusion lines, which exploit the well-known blown extrusion technology. This technology uses appropriately directed and thermoregulated air flows to cool and form the molten plastic ("melt") coming out of the extrusion die in the desired way.

The diffusion of this technology is a completely established and well-known fact all over the world, representing without any doubt the type of plant and technology with the greatest global diffusion.

There are also other technologies that lead to the production of plastic films for packaging, such as for example the so-called "cast" technology, in which the melt is cooled by contact with a rotating cylinder, cooled by a cooling fluid; apart from some specific well-defined markets, however, the blown technology is undoubtedly the most widely-used and common.

This widespread diffusion is certainly linked to the relative ease of use of the production lines, in addition to the considerable flexibility that they show from the point of view of the variety of products that can be extruded; last but not least, also the possibility of characterizing the film from the point of view of physical and mechanical properties, appropriately modulating the cooling process and film formation.

Above all this last feature represents the real strength of the blown technology, together with the intrinsic advantage of being a process subject to a very low percentage of waste (virtually zero under certain conditions, but also in the worst cases in the order of a few percent) and having a reduced energy consumption, and therefore a particularly high efficiency, when compared with alternative production technologies.

One of the very few, if not the only, difficulty or rather disadvantage of the blown technology relates to the adjustment precision of the transversal profile of the film produced which is relatively lower than the precision that can be obtained with other alternative technologies.

The cast technology, for example, thanks to the fact that it has a substantially direct relationship between the transverse dimension of the extruded melt and that of the final film (unless there is a shrinking effect at the exit of the die, commonly called "neck-in"), allows a precise and above all univocal regulation of the local thickness, which can be achieved by means of different systems. A mechanical adjustment of the profile of the same die is generally effected; this is made possible by the fact that the two "walls" of the extrusion die are basically independent of each other and therefore their relative position can be easily modified.

In the case of the blown technology, on the other hand, the only possible regulation is the so-called "centering" of the die, essentially consisting of a solid inner disk (so-called "male") and an external concentric ring (so-called "female"); the melt is passed into the meatus that is created between these two elements and therefore acquires the characteristic cylindrical or funnel-shaped form.

From what has been described, it is clear that the adjustment of the profile of the film produced with the blown technology can only correct "macro-defects" on a general level, in that, as already indicated, there is only the possibility of reaching (theoretically) the perfect concentricity between male and female. It is not possible, on the other hand, to locally correct any defect generated by possible problems of sliding or viscosity of the materials inside the die, a situation that is unfortunately common and frequent, especially in the case of "multipurpose" lines (i.e. in almost all cases).

The impossibility of correcting local profile defects leads, as an immediate and logical consequence, to the production of film reels characterized by the presence of so-called "cords", i.e. areas in which the thickness of the film is not homogeneous with the rest of the film, areas that can be either concave or convex, i.e. having both a greater and lesser thickness with respect to the average thickness of the film. In both cases, the presence of this localized inhomogeneity involves serious problems in the subsequent processings to which the vast majority of plastic films is generally subjected (coupling, printing, metallization, etc.).

Consequently, as the very concept of the blown technology does not allow the root of the problem to be solved, attempts have been made in the past to "bypass" the obstacle by intervening upstream of the same, i.e. trying to distribute the thickness defects over the whole width of the reel produced, so as to avoid the formation of the above-mentioned cords.

Rotating dies were therefore produced, which, by rotating around their own axis, provided a continuous distribution of local thickness defects over the whole width of the reel.

The arrival and subsequent rapid diffusion of the coextrusion technology, i.e. the simultaneous use of different extruders (typically from 3 to 11) for the production of multilayer films, having incomparably better characteristics with respect to single-layer films, led to the consequent excessive complication and lack of reliability of this solution, which was soon abandoned.

The application of so-called "oscillating drives" was subsequently adopted, i.e. systems in which the film, once formed, is rotated by means of a pair of "diagonal" bars which distribute systematic defects of the film thickness in the reel.

This solution is still universally used, but does not completely solve the problem: it has, in fact, great limits of applicability in the case of particularly sticky or particularly rigid films, as, in these cases, the rotation of said diagonal bars can very easily create wrinkles or folds that irreparably damage the quality of the reel.

More recently, the film profile was therefore adjusted by acting on the same in an active and non-passive manner, that is, by effectively adjusting its thickness; this solution, which is absolutely common today, is generally but not exclusively performed by means of a so-called "segmented disk" positioned below the outer cooling ring, which provides for cooling the outer part of the film.

Circumferentially to this disk, "n" segments are obtained, physically divided by metal sectors or any other material compatible with the boundary conditions. These segments regulate the quantity or temperature (or both parameters) of an air flow which therefore regulates the film thickness according to the values of the above-mentioned parameters.

Basically, taking as reference the possibility of adjusting the amount of air flow passing through the relative segment, the greater the air flow, the greater the cooling of the film locally will be guaranteed; consequently, the local thickness of the film will be greater than the rest of the film which, as it is warmer, will however have the possibility of being "stretched" in the machine direction and/or transversely, with the result that the final thickness decreases in the rest of the film.

This technology, together with the above-mentioned possibility of exploiting an oscillating drive for the distribution of errors in the reel, has led to obtaining a quality of the profile of the reel itself, if not yet comparable to that obtainable with the cast technology, at least adequate for the needs of the subsequent converting operations (coupling, printing, metallization, etc.).

As previously mentioned, however, the rotation of the oscillating drive is not always profitably applicable; the active adjustment of the profile consequently remains the only possibility for correcting thickness defects.

Even this solution, however, has known and evident limits, as the active adjustment of the profile acts on a cross-section of melt, variable according to the inflation ratio (so-called BUR or blow-up ratio); in particular, for blow-up ratios falling within the "normal" use of this kind of line, i.e. ranging from 2:1 to 4:1, the segment of the adjustment ring, typically but not necessarily having a size of around 25 mm, "expands" its working section, in fact, 2-4 times, with a consequent relative decrease in the resolution.

In other words, the segment necessarily acts on a portion of melt exiting from the extrusion die having a constant size, as already indicated, generally around 25 mm in width, but in the blown technology, it is absolutely normal, and in some cases necessary to improve the characteristics of the film, to effect a kind of orientation in a direction transverse to the motion of the film ("TD"), inflating the bubble until it acquires a diameter equal to 2-4 times the diameter of the starting die. It is therefore as if the single segment on which the adjustment of the profile acts were "stretched" transversely, physically increasing its size by a quantity equal to the BUR.

Consequently, even when applying all the expedients described above, the profile defects of films produced with the blown technology can in no case be completely eliminated, as they are intrinsic defects of the extrusion process itself, which, using polymer resins characterized by a "statistical distribution" of their physical-chemical characteristics, is in turn subject to this variability, which can in no way be determined and certainly not controlled.

Some examples of the above indicated methods for the active adjustment of the profile of monolayer or multilayer film, in an extrusion line with the blown technology, are disclosed in the following documents: EP 2 514 580 A2, DE 100 29 175 A1, DE 42 18 996 A1, GB 2 243 573 A, JP 2004 122435 A, JP 2005 254647 A.

SUMMARY OF THE INVENTION

The objective of the present invention is therefore to address this technical problem from a completely new point of view, by covering/masking the profile defects of the film, rather than eliminating the defects: furthermore, as can be seen, it is essentially impossible to eliminate them completely as the defects also depend on factors intrinsic to the nature of the polymer constituting the film and, as such, these defects often have a smaller transversal dimension than the resolution of the regulating instrument.

As explained above, in fact, the minimum width on which the profile adjustment system acts is approximately 25 mm, a value which in turn is multiplied by the BUR; consequently, the resolution of the adjustment system of the profile by means of a segmented disk is always at least greater than or equal to 25 mm, i.e. it is not possible in any way to correct a possible thickness defect whose width is less than this value.

Considering the cross-section of the film and assuming that the profile defects be identified as mountains or valleys with respect to a central line, the aim of the invention is not to eliminate the mountains and valleys, but to fill the spaces between the mountains and valleys until reaching a constant thickness, i.e. creating a "voluntary, variable defect" able to cover the inevitable defects that are created in the film production process.

The objective of the present invention is therefore to identify a device and a method for adjusting the profile of films produced with the blown technology which overcomes the drawbacks of the state of the art.

All of the problems previously indicated can be brilliantly overcome by the present invention which proposes to provide a device and a method for the active adjustment of the profile of films produced with the blown technology, capable of avoiding the limitations revealed by the state of the art, both in terms of precision and functionality.

An object of the present invention therefore relates to a method for the active adjustment of the monolayer or multilayer film profile, in an extrusion line with the blown technology, said method being characterized in that it comprises an active adjustment step of the profile, wherein said film profile is generated, by means of a sine wave, transversely movable, with an amplitude substantially equal to the profile tolerance reached with the basic adjustment of the profile and having a variable sliding frequency, wherein the step for the active adjustment of the profile is effected by means of a disk with "n" segments, physically divided by metal sectors or any other compatible material, which regulate the quantity or temperature, or both parameters, of a flow of cooling air.

The period of this sine wave, on the other hand, is closely linked to the resolution of the adjustment system which can generate said wave, therefore being substantially constrained by the hardware available, i.e. the construction features of the profile adjustment system.

The wave is a "sine curve" completely definable and defined both in amplitude and in frequency, the latter proportional to the extent of the defect not corrected by the basic adjustment system of the profile.

The active adjustment step of the profile, i.e. the generation of the profile by means of the sine curve, is effected by means of a control algorithm which, based on theoretical calculations validated by subsequent field experimentation, allows the immediate generation of the sine wave, without having to wait for any feed-back from the thickness gauge during the actual production phase of the film, but keeping to the maximum defect value predictable at each point of the film, based on the theoretical calculations and found at each reading of the measurement systems in the initial development phase of the specific production.

Each production, in fact, has an initial development phase of the plant to reach regime: in this development phase, the thickness gauges detect the thickness defects at each point of the film produced with only the basic adjustment, i.e. without the adjustment according to the method of the present invention. The amplitude and frequency values of the sine wave are identified on the basis of this measurement, specific for the film in production, and on the basis of theoretical calculations validated by the field experimentation, whereas, as already indicated, the period of the sine wave is a quantity which, although also of considerable importance, is substantially determined by the construction features of the profile adjustment system, which, as can be seen, can acquire the most varied and variable forms.

Therefore in the active adjustment method according to the present invention, the amplitude of the sine wave proportional to the extent of the existing error, is defined in an initial development phase of the film production, in which the thickness is detected, and consequently the defects of the profile, in every point of the film produced with the basic adjustment.

The sine curve is therefore defined in amplitude by the extent of the existing error, whereas the frequency depends on the operating conditions of the line (speed, thickness, flow-rate, etc.).

The frequency is therefore difficult to define a priori; a skilled person in the field is certainly capable of defining it experimentally based on the analysis of the effect of said wave on the profile of the film.

The thickness gauges are therefore used for determining the profile of the film "without" a sine wave, a measurement that allows, as previously specified, the amplitude of the wave to be determined; they supply the correct feed-back to the profile adjustment system for the first correction, i.e. to apply the active adjustment step of the film profile according to the method of the present invention with a sine wave having a correct amplitude.

Subsequently, the active adjustment step of the film profile is applied for the first time with a sine wave having the amplitude determined and with a theoretically calculated frequency based on the characteristics of the production line, and the thickness measurement systems provide a second feed-back that also allows the wave frequency for a given production to be optimized.

In the active adjustment method according to the present invention, therefore, the frequency of the sine wave is defined in the first production session of a film with application of the sine wave having the defined amplitude.

At this point, the profile adjustment system proceeds automatically, whereas the thickness measurement systems constantly interact with the adjustment system to verify the reliability and effectiveness of the sine curve thus determined, possibly modifying the sine wave in the case of divergence from the data calculated and determined at the first start.

The operations described above relate, however, to the first start of a specific production of a film; in other words, once the most significant values characterizing the sine wave have been determined (i.e. amplitude and frequency, since, as already mentioned, the period is a value determined by the construction form of the profile adjustment system and therefore subject to constraints of a mechanical nature), the same are saved in a specific recipe relating to said production, so that they can be recalled and re-used each time the same production is effected.

In this way, once these values have been determined and saved, the regime setup time of the line becomes absolutely reduced and compatible with production requirements, being theoretically even lower than the time required for a "classic" adjustment system with an oscillating drive which, as can be seen, is always constrained not only to the reaction rapidity of the segmented disc but also to the rotation speed of the drive.

Further objects of the present invention also relate to a monolayer or multilayer film, having a profile that can be obtained by the active adjustment method according to the present invention, and a reel formed by said monolayer or multilayer film.

In the text of the present patent application, the basic adjustment of the profile refers to the adjustment effected first by means of the male-female coupling in the die and then by the fine control disk of the profile, i.e. by means of the disk with "n" segments, physically divided by metal sectors or any other material compatible with the boundary conditions, which regulate the quantity or temperature (or both variables) of the cooling air flow which allow, as described above, the film thickness defects to be reduced but not eliminated.

Basically, by creating a defect of an entity comparable to that already existing and making it move transversely over the whole width of the film, the method/system according to the present invention is able to cover/mask defects that cannot be corrected by the existing adjustment system, inducing a kind of "virtual skidding" of the film, or obtaining the same effect that occurs with the physical rotation of the oscillating drive.

The active adjustment step of the film profile according to the method of the present invention can be carried out by means of the same segmented disk which effects the basic adjustment of the film profile.

In fact, the same segmented disk described above and currently used only for the basic adjustment of the profile, is operated, also applying a particular control algorithm, which "superimposes" the existing base adjustment profile also with a second active adjustment profile which, by means of a sine wave, transversely movable, with an amplitude substantially equal to the profile tolerance reached with the basic adjustment of the profile and having a variable sliding frequency, based on various factors (which typically, but not exclusively, can be the speed of the line, the final width of the film to be produced, the thickness of the film, and so forth), enables the active adjustment of the film profile according to the present invention.

There are numerous advantages of the solution according to the present invention linked to different aspects of both the method and the production lines of multilayer film with the blown technology.

A first advantage of the solution according to the present invention is in fact that it makes the presence of the oscillating drive totally useless, with considerable benefits i) in terms of productivity: even particularly tacky or rigid films can in fact be treated successfully, contrary to what is currently the case with the systems of the state of the art which provide for the presence of the oscillating drive;

ii) in economic terms with a significant saving from the point of view of the initial investment for the purchase of the extrusion line, of which the oscillating drive represents, in economic terms, a considerable part.

Furthermore, with the elimination of the oscillating drive, there is the consequent direct and constant alignment between the segments of the control disk of the profile and the relative position on the film, and therefore on the final reel; in other words, with the presence of the oscillating drive, the single segment regulated by the disk continuously varies position on the final reel, making it impossible, for example, to create voluntary "cords" of thickness in a fixed and controllable position, which are an extremely important resource for certain applications.

An example of this requirement is represented by the production of stretch films having a low thickness, for industrial and domestic use; in these cases, i.e. in cases in which the nominal thickness of the film can be even less than 10 microns, it is important to produce a film having two thin side strips with a much higher thickness, even twice the nominal thickness, in order to increase the resistance properties of the film, without however significantly increasing the weight.

It is evident that a production of this type would not be possible with a "traditional" line, as, if an oscillating drive were used, the alignment between segments of the disc and the final reel would be completely lost, while also blocking the drive, in addition to the cords generated at the edges of the reel and therefore desired, additional undesired cords would also be generated, due to the impossibility of adjusting them correctly.

Another similar case, but with the opposite aim, relates to the implementation of a so-called unidirectional stretching unit, also called MDO, which reduces the final thickness of the film by stretching it in the winding direction also various times. This operation, carried out by means of rotating cylinders at different rates from which the film is pulled, also inevitably leads to the generation of two side edges having a greater thickness than the rest of the film, due to the physical effect given by the neck-in which is generated during the stretching operation.

In this case, there is evidently the need for creating a profile of the initial film, i.e. of the film before the unidirectional stretching unit MDO, with the edges having a concave trend, so that the subsequent stretching operation does not lead to the generation of undesired excess thicknesses.

Furthermore, the possibility of having a perfect and constant alignment, as already mentioned, between the segments of the adjustment disc of the profile and the physical position of the film in the reel allows an easy and profitable use of so-called "portal" thickness measurement systems, based on the X-ray technology, beta rays or IR rays (or any other technology that requires this configuration).

This possibility is currently strongly limited by the necessity, by said "portal" measurement systems, of having not only a ray emitting source, but also a receiver, positioned perfectly parallel to the source.

It is evident that this possibility is not practicable with a classic blown extrusion line, again due to the rotation of the drive that continuously misaligns the film with respect to the die. It would otherwise be necessary to provide sophisticated and "slow" calculation algorithms that are based only on the calculated position of the oscillating drive and therefore cannot take into account any possible transversal "slipping" of the film. This slipping is always possible and is indeed extremely frequent due to the configuration of the diagonal bars of the oscillating drive, in addition to obviously depending on the nature of the film.

The methods and systems of the state of the art therefore use less precise thickness reading systems, so-called "capacitive" systems, which have a resolution not comparable to "portal" systems, and above all they are not able to read with a reasonable degree of reliability the thickness of polymers such as PA and EVOH, particularly used in the field of food packaging thanks to the specific barrier characteristics with respect to oxygen, i.e. in packagings inside which any modified atmosphere must be guaranteed.

BRIEF DESCRIPTION OF THE DRAWINGS

FIG. 1 illustrates an example of a film profile, with FIG. 1A illustrating a film profile produced with a blown extrusion line, without an active adjustment step of the film profile; FIG. 1B illustrating a film profile produced with a blown extrusion line, with an active adjustment step of the film profile; FIG. 1C illustrating a reel profile obtained from the film of FIG. 1A; and FIG. 1D illustrating a reel profile obtained from the film of FIG. 1B.

DETAILED DESCRIPTION OF EMBODIMENTS OF THE INVENTION

In the attached FIG. 1, an example of a film profile is shown, produced a) with a blown extrusion line, without the active adjustment step of the film profile according to the method of the present invention and provided with the basic adjustment step of the film profile (FIG. 1A);

b) with a blown extrusion line, provided with both the basic adjustment step of the film profile and the active adjustment step of the film profile according to the method of the present invention (FIG. 1B);

and an example of a reel profile obtained starting from said film a) (FIG. 1C) and from said film b) (FIG. 1D).

From FIG. 1 as a whole, it is clear that not only does the active film system/adjustment method allow the profile of a single film or a single local part of film to be improved, but it also allows a "high-quality" reel to be obtained, i.e. a reel with an improvement in the maximum thickness tolerance of over 30%, an extremely important result.

The regularization of the film profile, in fact, also entails a clear improvement in the reel profile, with an improved result compared to what can be obtained with the rotating drive, which does not physically modify the profile of the film, but simply "spreads" the errors in such a way that they are self-compensated.

Figure 2:
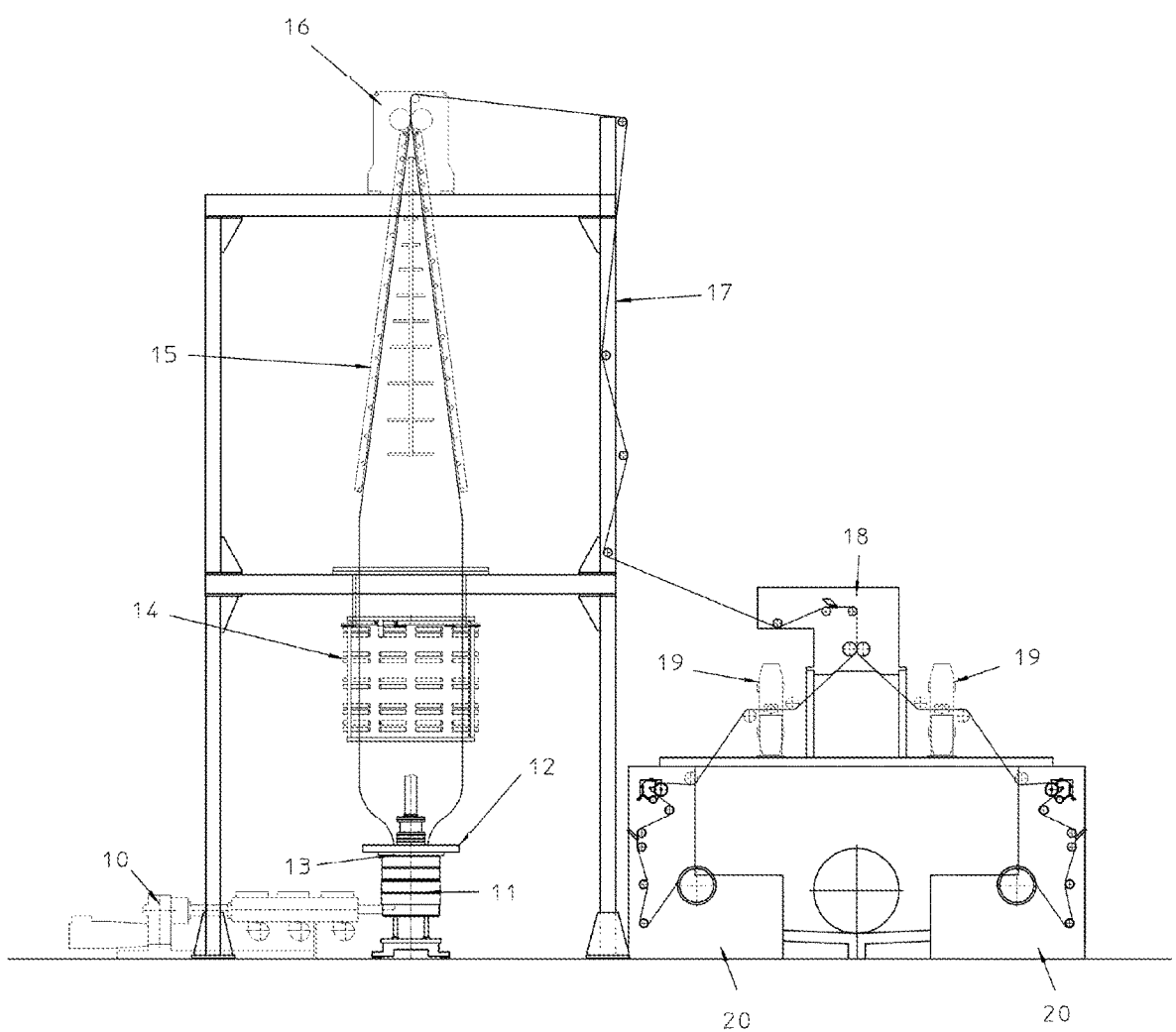
FIG. 2 illustrates an extrusion line according to the invention.

An example of an extrusion line which allows the method according to the present invention to be implemented, is schematically represented in FIG. 2, which shows:

at least one extruder 10 (the extruders can be of an absolutely variable number depending on the final product desired);

an extrusion die 11, or "head" (the extrusion die can be of any shape or size, both in terms of outlet diameter and number of layers of the film);

an external cooling ring 12, indifferently using ambient or thermoregulated air;

a segmented disk 13 for the basic adjustment of the profile and for the active adjustment of the profile through the introduction of the "voluntary" defect (as described in detail above, various solutions are possible, by adjusting the air flow or its local temperature, or by the combination of said two parameters, or by any other methods that determine a variation in the local thickness of the film); said segmented disk can exploit the same air used for the cooling ring 12, use an independent air source, or use an air source in common with other uses, whether it is taken directly from the environment or thermoregulated;

a calibrator basket 14;

a series of rollers 15 for flattening the tube;

a drive 16 typically but not exclusively composed of a pair of motorized rollers in contact with each other;

a supporting structure 17, which supports the elements previously described;

a cutting system 18 of the tube, which separates the two final films;

two bridge-type thickness reading systems 19, one for each film produced; the reading system can be of the "portal" type, which, as indicated, is more precise, or also of the "capacitive" type;

a pair of winders 20, for forming the reels.

Obviously, the final configuration of an extrusion line can differ in many details from what is schematically represented in FIG. 2, above, without prejudice to the adjustment concept of the profile so far expressed.

Figure 3:
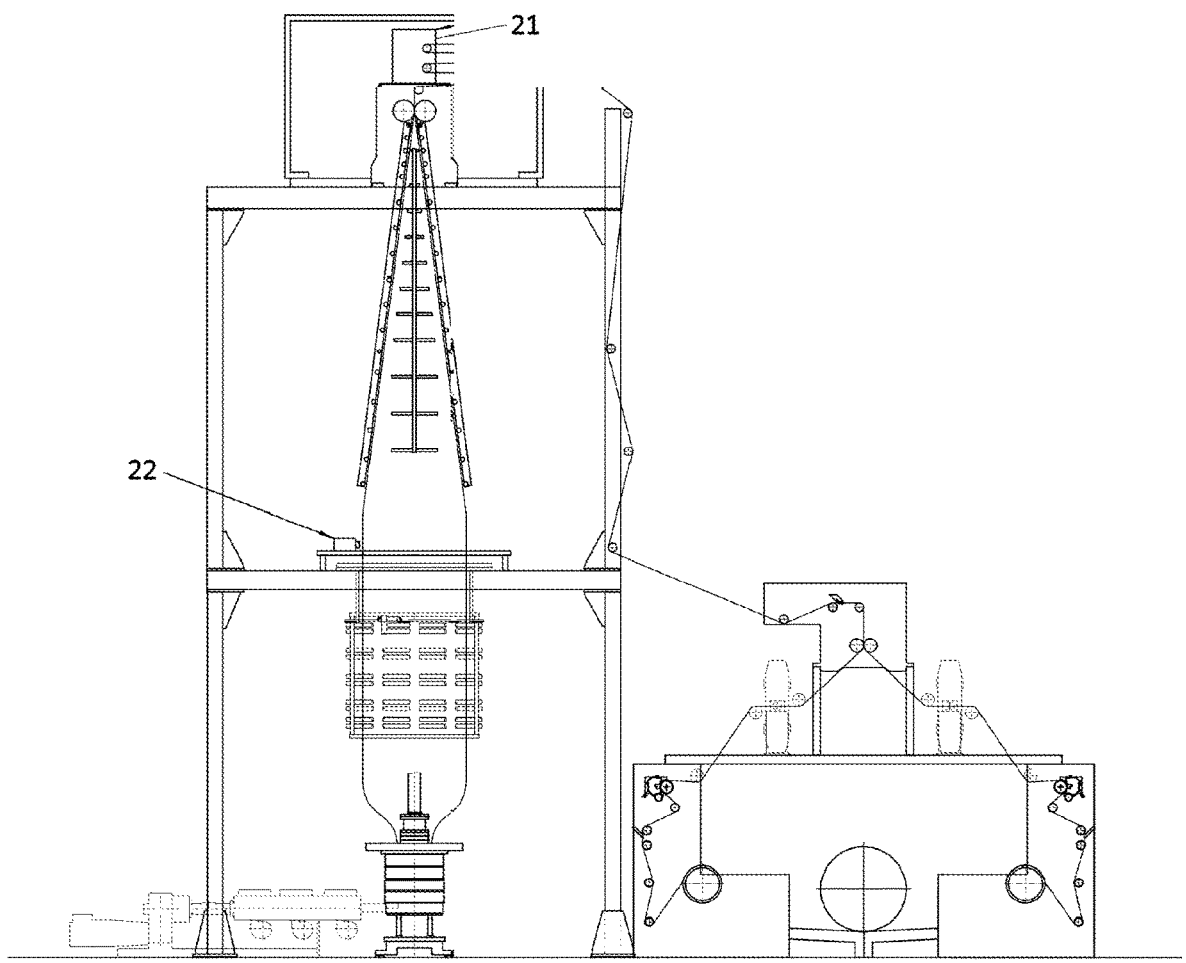
FIG. 3 illustrates an extrusion line according the invention, which includes an oscillating drive and a system for reading film thickness.

As shown in FIG. 3, for example, with a view to seeking maximum flexibility in the use of the extrusion line, it would also be possible to provide on the line, the presence of an oscillating drive 21 and a system for reading the thickness 22 of the capacitive type, useful if a single reel is to be produced, or without the tubular cutting step. For this type of production, typically not particularly "high-quality" and therefore with less need for having a perfect profile, the traditional solution of the oscillation of the drive together with the only basic adjustment of the thickness of the film through the segmented disc is considered absolutely adequate, whereas the solution proposed herein does not in any case allow an accurate adjustment of the profile, due to the impossibility of determining to which of the two sides forming the tube, the possible profile defect read by the single bridge-measurement system used for the reading, can be ascribed. In the blown extrusion line shown in FIG. 3, therefore, depending on the characteristics of the final film, the method according to the state of the art or the method according to the present invention can be applied.

The invention claimed is:

1. A method for active adjustment of a monolayer or multilayer film profile, in an extrusion line with blown technology, said method comprising:
a step of actively adjusting the film profile, wherein said film profile is generated with a sinusoidal wave, transversely movable, with an amplitude substantially equal to a profile tolerance reached with a basic adjustment of the film profile and having a variable sliding frequency,
wherein the step of actively adjusting the film profile is performed with a disk with "n" segments, physically divided from each other, which regulate quantity, temperature, or both the quantity and the temperature of a flow of cooling air,
wherein the sinusoidal wave has the amplitude and a frequency proportional to an extent of a defect not corrected by a basic adjustment system of the film profile,
wherein the amplitude of the sinusoidal wave is defined in an initial development step of film production, and
wherein a thickness is detected, and consequently profile defects, in each point of a film produced with the basic adjustment.

2. The method according to claim 1, wherein the sinusoidal wave is defined by a control algorithm.

3. The method according to claim 1, wherein the frequency of the sinusoidal wave is defined in a first production session of the film with application of the sinusoidal wave having a defined amplitude.

* * * * *